Patented Mar. 30, 1954

2,673,878

UNITED STATES PATENT OFFICE 2,673,878

DERIVATIVES OF BASICALLY SUBSTITUTED 1-ALKYL-3-ARYL UREAS

John W. Cusic, Skokie, Ill., assignor to G. D. Searle & Co., Chicago, Ill., a corporation of Illinois No Drawing. Application June 6, 1952, Serial No. 292,201

16 Claims. (Cl. 260—553)

This invention relates to new groups of tri- and tetra-substituted urea derivatives and in particular to compounds of the structural formula

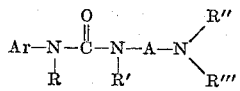

and their non-toxic salts, wherein A is a bivalent aliphatic hydrocarbon radical separating the two nitrogen atoms attached thereto by at least two carbon atoms, Ar is an aryl radical, R is a member of the class consisting of hydrogen, lower alkyl radicals and aromatic hydrocarbon radicals; R' is an isocarbocyclic radical which is either a lower cycloalkyl radical or an aromatic hydrocarbon radical; and NR"R''' is either a lower dialkylamino radical or a nitrogen-containing heterocyclic radical attached through a nitrogen in the heterocycle to the radical A.

In the foregoing structural formula the radical A represents a bivalent saturated aliphatic hydrocarbon radical containing two carbon atoms separating the two nitrogen atoms; it may be of the branched or unbranched type and includes such radicals as ethylene, propylene, butylene, amylene, hexylene, as well as polymethylenes such as trimethylene, tetramethylene, pentamethylene and hexamethylene. Ar represents an aryl group which may be either a hydrocarbon or a halogenated hydrocarbon such as phenyl, tolyl, xylyl, naphthyl, chlorophenyl, bromotolyl, iodonaphthyl, and the like. In practice I prefer aryl radicals containing between six and ten carbon atoms.

The radical R can be hydrogen, an aryl group of the foregoing type, a lower alkyl radical such as methyl, ethyl, and straight and branched chain propyl, butyl, amyl and hexyl, or a lower aralkyl radical such as benzyl, phenethyl, alkylbenzyl and the like. The isocarbocyclic radical R' can be an aryl or aralkyl hydrocarbon radical of the type as defined hereinabove or a lower cycloalkyl radical such as cyclopropyl, cyclobutyl, cyclopentyl and cyclohexyl. The radicals R" and R''' represent lower alkyl groups. The radicals R" and R''' in conjunction with the nitrogen attached thereto can also form nitrogen-containing heterocycles such as morpholine; where R" and R''' are combined to form a lower alkylene radical, preferably of four to seven carbon atoms containing four to five in nuclear position, there are formed pyrrolidino, piperidino, dimethylpyrrolidino and lupetidino radicals.

For therapeutic administration it is useful to administer the organic bases of the foregoing type in the form of their non-toxic salts which they form with a variety of inorganic and strong organic acids including sulfuric, phosphoric, hydrochloric, hydrobromic, sulfamic, citric, oxalic, ascorbic and related acids. They also form quaternary ammonium salts with a variety of organic esters of sulfuric, hydrohalic and aromatic sulfonic acids which provide anions which are non-toxic in therapeutic dosages. Among such esters are methyl chloride and bromide, ethyl chloride, propyl chloride, butyl chloride, isobutyl chloride, benzyl chloride and bromide, naphthylmethyl chloride, dimethyl sulfate, diethyl sulfate, methyl benzenesulfonate, ethyl toluenesulfonate, ethylene chlorohydrin, propylene chlorohydrin, allyl bromide, methallyl bromide and crotyl bromide.

The object of this invention is to provide novel chemical compositions of the type indicated hereinabove. These compounds have been found to have valuable therapeutic properties. Thus it has been found that the simple addition salts are valuable in producing diuresis. These salts also have shown valuable cardiovascular properties in antagonizing the hypertensive effect of certain adrenal hormones and in exerting a regulatory effect on abnormal auricular heart rhythm. The quaternary ammonium salts of the type indicated above have proven to be potent inhibitors of the transmission of sympathetic and parasympathetic nerve impulses through the autonomic ganglia. This property is shown to a lesser extent by some of the hydrohalides. The compounds of the formula shown above, wherein the Ar radical is a halogenated aryl radical, have been shown to be parasiticidal when tested on intestinal amebae.

In the preparation of these urea derivatives I prefer to heat a trisubstituted alkylenediamine of the formula

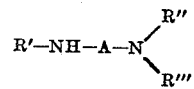

with a carbamyl chloride of the formula

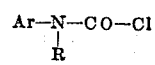

all symbols being of the type as defined hereinabove, in an anhydrous organic solvent in which both starting materials are soluble such as a lower alkanone or aromatic hydrocarbon. In the preparation of the trisubstituted ureas, in which R is hydrogen, an isocyanate of the type, Ar—N=C=O may be substituted for the carbamyl chloride.

My invention will be described more fully in conjunction with the following examples. It should be understood, however, that these examples are given by way of illustration only and that the invention is not to be construed as limited in spirit or in scope by the details set forth. It will be apparent to those skilled in the art that many modifications in materials and methods may be made without departing from the invention. In each of these examples, temperatures are given uncorrected in degrees centigrade (°C.), pressures during vacuum distillation are given in millimeters (mm.) of mercury, and amounts of materials in parts by weight.

This application is a continuation-in-part of my copending application Serial No. 182,131, filed August 29, 1950, now abandoned.

EXAMPLE 1

*N-(β-diethylaminoethyl) carbanilide*

A mixture of 384 parts of N-(β-diethylaminoethyl)-aniline and 238 parts of phenylisocyanate in 2650 parts of benzene is heated at refluxing temperature for 12 hours. A small amount of alcohol is then added to destroy the small residue of phenyl isocyanate. The N-(β-diethylaminoethyl)-carbanilide is distilled at about 160–162° C. and 1 mm. pressure. It has the structural formula

C₆H₅—NH—CO—N(C₆H₅)—
CH₂—CH₂—N(C₂H₅)₂

EXAMPLE 2

*1-(β-diethylaminoethyl)-1-phenyl-3-(o-chlorophenyl)urea*

192 parts of N-(β-diethylaminoethyl)aniline and 153 parts of o-chlorophenyl isocyanate are mixed in 2600 parts of benzene. The charge becomes warm on mixing. After heating at refluxing temperature for 12 hours, a small quantity of isopropanol is added in order to decompose any unreacted isocyanate. The charge is extracted with dilute hydrochloric acid, and the hydrochloric acid layer is rendered alkaline by addition of dilute sodium hydroxide and extracted with ether. The ether extract is dried over anhydrous potassium carbonate, filtered and evaporated. The 1-(β-diethylaminoethyl)-1-phenyl-3-(o-chlorophenyl)urea distills at about 194–196° C. at 1 mm. pressure. An ether solution of the base is treated with a 25% solution of hydrogen chloride in anhydrous isopropanol. The hydrochloride precipitates upon standing at 0° C. Upon recrystallization from ethyl acetate it melts at about 127–130° C. The structural formula of the base is

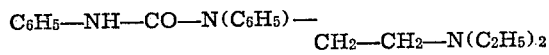

EXAMPLE 3

*1-(β-diethylaminoethyl)-1-benzyl-3-phenylurea*

206 parts of N-(β-diethylaminoethyl)benzylamine and 119 parts of phenylisocyanate are mixed in 2650 parts of benzene with cooling. The charge is then heated for 4 hours at refluxing temperature. After standing a small amount of alcohol is added to decompose the unreacted isocyanate. The 1-(β-diethylaminoethyl)-1-benzyl-3-phenylurea is distilled at about 205–206° C. and 10 mm. pressure.

EXAMPLE 4

*1-(β-dimethylaminoethyl)-1-(α-phenethyl)-3-(p-tolyl)urea*

240 parts of acetophenone and 220 parts of ethanol are treated with 176 parts of N,N-dimethylethylenediamine and 150 parts of Raney nickel with slight warming. The mixture is then introduced into a Parr bomb and hydrogenated therein at about 130° C. under 500–600 pounds pressure for 5 hours. After cooling the contents are filtered and the solvent is removed from the filtrate by distillation. The N-(β-dimethylaminoethyl)-α-phenethylamine is distilled at about 60–70° C. and 0.2 mm. pressure.

192 parts of this amine and 133 parts of p-tolylisocyanate are mixed in 2700 parts of toluene with cooling and then heated at reflux temperature for 5 hours. A small amount of ethanol is added to decompose the unreacted isocyanate. Distillation at about 195–200° C. and 7 mm. pressure yields the 1-(β-dimethylaminoethyl)-1-(α-phenethyl)-3-(p-tolyl)urea. It has the structural formula

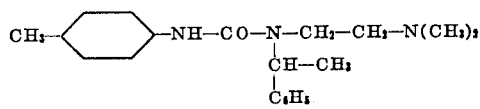

EXAMPLE 5

*1-(β-diethylaminoethyl)-1-cyclohexyl-3-phenylurea*

To a mixture of 232 parts of N,N-diethylethylenediamine and 196 parts of cyclohexanone, chilled in ice water, 94 parts of a 98% solution of formic acid is slowly added. The charge is gradually heated and maintained at refluxing temperature for 5 hours. After standing for some time 220 parts of concentrated hydrochloric acid are cautiously added and the mixture is heated at refluxing temperature for 6.5 hours. 300 parts of water are added and after washing with 130 parts of benzene, the aqueous solution is rendered alkaline with potassium hydroxide and extracted twice with benzene. The benzene extract is washed with water, dried over anhydrous sodium sulfate and evaporated in vacuo. The residue is distilled at about 130–134° C. and 19 mm. pressure. 198 parts of the N-(β-diethylaminoethyl)-hexahydroaniline thus prepared are heated at refluxing temperature for 4 hours with 119 parts of phenylisocyanate in 2650 parts of benzene. A small quantity of alcohol is added to decompose the unreacted isocyanate. The 1-(β-diethylaminoethyl)-1-cyclohexyl-3-phenylurea is distilled at about 180–181° C. at 10 mm. pressure. An ether solution of the base is treated with a 25% solution of hydrogen chloride in anhydrous isopropanol and the hydrochloride thus obtained is recrystallized from a mixture of ethyl acetate and isopropanol. It melts at about 159–160° C. The structural formula is

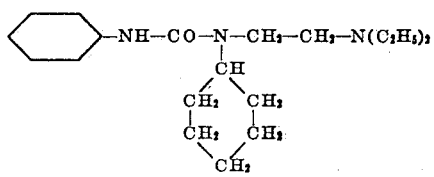

EXAMPLE 6

*N-(β-diethylaminoethyl)-N'-methylcarbanilide*

A mixture of 192 parts of N-(β-diethylaminoethyl)-aniline and 169 parts of N-methylcarbanilyl chloride in 2400 parts of butanone is heated at refluxing temperature for 2 days. The solvent is evaporated on the steam bath and, upon addition of water, the entire mass enters into solution. After washing with ether, the aqueous solution is rendered alkaline by addition of dilute sodium hydroxide. This alkaline solution is extracted with ether and the ether extract is dried over anhydrous potassium carbonate, filtered and evaporated. The N-(β-diethylaminoethyl)-N'-methylcarbanilide is distilled at about 203–205° C. and 3 mm. pressure. It has the structural formula C₆H₅—N(CH₃)—CO—N(C₆H₅)—
CH₂—CH₂—N(C₂H₅)₂

An ether solution of this base is treated with a 25% solution of hydrogen chloride in anhydrous isopropanol. After concentration and standing for several days the hydrochloride crystallizes. It may be recrystallized from ethyl acetate.

EXAMPLE 7

*N - (β - diethylaminoethyl) - N' - methylcarbanilide methiodide*

100 parts of N-diethylaminoethyl-N'-methylcarbanilide are treated with 228 parts of methyl iodide in 4000 parts of butanone. Upon standing at 0° C. a solid precipitate forms within a few minutes. The N-(β-diethylaminoethyl)-N'-methylcarbanilide methiodide melts at about 117–118° C. In order to prepare the citrate, an isopropanol solution of 3 moles of the iodide is treated with one mole of silver citrate and two moles of anhydrous citric acid with stirring at room temperature. The silver iodide is removed by filtration and the filtrate concentrated in vacuo. The cation has the structural formula

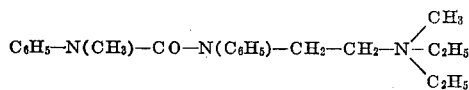

EXAMPLE 8

*1 - (β - dimethylaminoethyl) - 1 - (o,p - xylyl) - 3-phenyl-3-methylurea*

A mixture of 169 parts of N-methylcarbanilyl chloride and 192 parts of N-(β-dimethylaminoethyl)-o,p-xylylamine in 2500 parts of butanone is heated at reflux temperature for 10 hours and solvent stripped on the steam bath. The reaction product is treated with water and the aqueous solution is washed with ether, rendered alkaline by addition of dilute ammonium hydroxide and extracted with ether. This ether extract is dried over anhydrous potassium carbonate, filtered and evaporated to yield the 1-(β-dimethylaminoethyl) - 1 - (o,p - xylyl) - 3 - phenyl - 3 - methylurea as an oil, which is distilled at about 188–194° C. and 2 mm. pressure. It has the structural formula

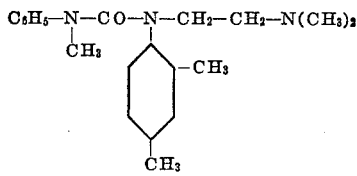

EXAMPLE 9

*1 - (β - morpholinoethyl) - 1 - benzyl - 3 - phenyl-3-methylurea*

Upon mixing of 169 parts of N-methylcarbanilyl chloride and 220 parts of N-(β-benzylaminoethyl)morpholine in 1600 parts of butanone, a precipitate forms. The mixture is heated at reflux temperature for 10 hours and chilled. The precipitate is then collected on a filter and dissolved in water. This solution is rendered alkaline by addition of sodium hydroxide and then extracted with ether. The extract is dried over anhydrous potassium carbonate, filtered and evaporated to yield the 1-(β-morpholinoethyl)-1-benzyl-3-phenyl-3-methylurea as an oil which is distilled at about 205–208° C. and 2 mm. pressure. Treatment of an ether solution of this base with one equivalent of a 25% solution of hydrogen chloride in anhydrous isopropanol yields the initially oily hydrochloride which solidifies within a few minutes. Recrystallized from a mixture of isopropanol and ethyl acetate it melts at about 164–165° C. This salt has the structural formula

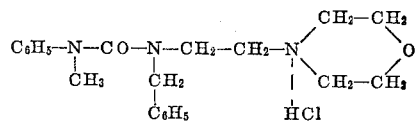

EXAMPLE 10

*N-(β-diethylaminoethyl)-N'-ethylcarbanilide*

A mixture of 192 parts of N-(β-diethylaminoethyl)-aniline and 183.5 parts of N-ethylcarbanilyl chloride in 2400 parts of butanone is heated at refluxing temperature for 12 hours. After concentration on the steam bath, water is added and the aqueous solution is washed with ether. The water layer is then made alkaline by addition of dilute sodium hydroxide and extracted with ether. The ether extract is dried over anhydrous potassium carbonate, filtered and evaporated. The residue is distilled at about 198–199° C. and 2 mm. pressure. An ether solution of the base is treated with a 25% solution of hydrogen chloride in isopropanol. The hydrochloride of N - (β - diethylaminoethyl - N' - ethylcarbanilide solidies on standing. Upon recrystallization from ethyl acetate it melts at about 101–102° C.

EXAMPLE 11

*N - (β - diethylaminoethyl) - N' - ethylcarbanilide methiodide*

100 parts of N-diethylaminoethyl-N'-ethylcarbanilide in 320 parts of butanone are treated with 228 parts of methyl iodide at 0° C. for 2 hours. Upon addition of a small amount of ether, an oily precipitate forms which solidifies within a short time. The N-(β-diethylaminoethyl)-N'-ethylcarbanilide methiodide melts at about 174–175° C. The iodide is converted into the tartrate by treatment of 2 moles of the iodide with 1 mole of tartaric acid and 1 mole of silver tartrate in cold absolute methanol with stirring. The silver iodide is removed by filtration and the residue evaporated. The cation has the structural formula

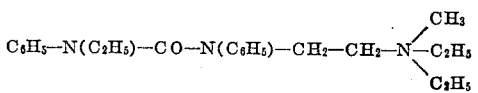

EXAMPLE 12

*1-(β-piperidinoethyl)-1-phenyl-3-(p-iodophenyl)-3-ethylurea*

A mixture of 619 parts of N-ethyl-p-iodocarbanilyl chloride and 204 parts of β-anilinoethylpiperidine in 4000 parts of butanone is heated at reflux temperature for 15 hours, cooled and extracted with dilute hydrochloric acid. The acidic extract is washed with ether, rendered alkaline by addition of sodium hydroxide and then extracted with ether. This ether extract is dried over anhydrous potassium carbonate, stirred with decolorizing charcoal, filtered and ether stripped to yield the 1-(β-piperidinoethyl)-1-phenyl-3-(p-iodophenyl)-3-ethylurea as a clear, high boiling, amber oil which has the structural formula

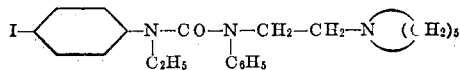

EXAMPLE 13

*N-(β-diethylaminoethyl)-N'-(n-butyl) carbanilide*

To a solution of 438 parts of n-butylaniline in 570 parts of anhydrous ether is added a solution of 158 parts of phosgene in 350 parts of toluene in the course of 45 minutes while cooling with ice and stirring. Then 700 parts of benzene are added and stirring is continued for 1 hour. The charge is filtered and the solvent removed from the filtrate in vacuo. The N-n-butylcarbanilyl chloride distills at about 160–165° C. at 20 mm. pressure.

211 parts of this N-n-butylcarbanilyl chloride is heated at refluxing temperature for 12 hours with 192 parts of N-(β-diethylaminoethyl)aniline in 2400 parts of butanone. Upon concentration on the steam bath the N-(β-diethylaminoethyl)-N'-(n-butyl)carbanilide hydrochloride solidifies. Upon crystallization from ethyl acetate it melts at about 119–120° C. The structural formula is

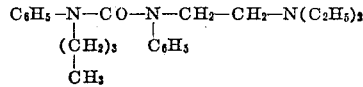

EXAMPLE 14

*1-(β-diethylaminoethyl)-1,3,3-triphenylurea*

A mixture of 130 parts of N-(β-diethylaminoethyl)aniline and 133 parts of diphenylcarbamyl chloride in 2400 parts of butanone is heated at refluxing temperature for 12 hours. After cooling the hydrochloride of 1-(β-diethylaminoethyl)-1,3,3-triphenylurea is collected on a filter and dried. It melts at about 238–240° C.

EXAMPLE 15

*1-(β-diethylaminoethyl)-1,3,3-triphenylurea methobromide*

An aqueous solution of the hydrochloride of 1-(β-diethylaminoethyl)-1,3,3-triphenylurea is rendered alkaline and extracted with ether. 200 parts of the free base obtained by the evaporation of the ether are dissolved in 600 parts of butanone and treated in a shielded pressure reactor with 260 parts of methyl bromide. After standing at room temperature for several hours the contents are cooled and treated with ether. The oily precipitate is separated and dissolved in a mixture of ethyl acetate and isopropanol. Upon chilling the hygroscopic 1-(β-diethylaminoethyl)-1,3,3-triphenylurea methobromide precipitates, which melts at about 179–180° C. and has the structural formula

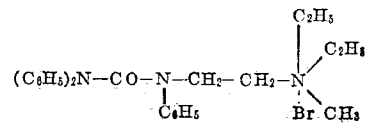

EXAMPLE 16

*1-(β,β-diethyl-γ-dimethylaminopropyl)-1-(p-anisyl)-3,3-di-(β-naphthyl)urea*

A mixture of 280 parts of p-anisidine and 46 parts of lithium amide is heated with stirring in 1400 parts of anhydrous xylene at about 120° C. for 24 hours. While maintaining the temperature at 100–110° C. and with stirring, 355 parts of N,N-dimethyl-β,β-diethyl-γ-chloropropylamine (cf. C. Mannich and G. Baumgarten, Ber. Deut. Chem. Ges., 70:210;1937) are added. Heating at 110° C. with stirring is continued for 24 hours, after which the solvent is evaporated in vacuo and the (β,β-diethyl-γ-dimethylaminopropyl)-p-anisidine is purified by vacuum distillation. 263 parts of this aniline derivative are heated with 332 parts of di-β-naphthylcarbamyl chloride in 1500 parts of benzene at refluxing temperature for 12 hours. The charge is then extracted with dilute hydrochloric acid and the extract rendered alkaline by addition of dilute sodium hydroxide. The base is then extracted with ether, the ether extract is dried over anhydrous potassium carbonate, stirred with charcoal and filtered. Upon evaporation of the ether, the 1-(β,β-diethyl-γ-dimethylaminopropyl)-1-(p-anisyl)-3,3-di-(β-naphthyl)urea is obtained as a clear oil. It has the structural formula

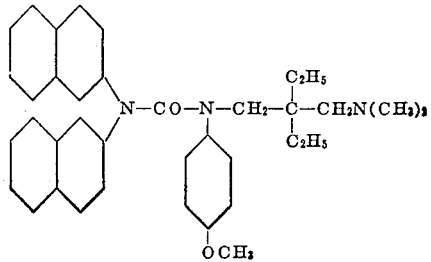

EXAMPLE 17

*1-(β-diethylaminoethyl)-3-benzyl-1,3-diphenylurea*

A mixture of 248 parts of N-benzylcarbanilyl chloride and 192 parts of N-(β-diethylaminoethyl)aniline in 1600 parts of butanone is heated at reflux temperature for 10 hours. Upon cooling the hydrochloride of 1-(β-diethylaminoethyl)-3-benzyl-1,3-diphenylurea precipitates, which melts at about 114–116° C. It has the structural formula

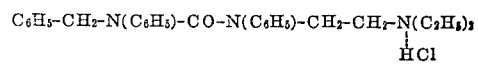

EXAMPLE 18

*1-(β-diethylaminoethyl)-1-cyclohexyl-3-benzyl-3-phenylurea*

A mixture of 245 parts of N-benzylcarbanilyl chloride and 198 parts of N-(β-diethylaminoethyl)hexahydroaniline in 1700 parts of butanone is heated at reflux temperature for 12 hours and then cooled. The residual oil is separated and dissolved in warm water. This solution is made alkaline by addition of potassium hydroxide and the resulting heavy oil is extracted with ether. This ether extract is dried over anhydrous potassium carbonate, filtered and evaporated to yield the 1-(β-diethylaminoethyl)-1-cyclohexyl-3-benzyl-3-phenylurea as an oil which is distilled at about 216–218° C. and 2 mm. pressure.

EXAMPLE 19

1-(β-diethylaminoethyl)-1-cyclohexyl-3-benzyl-3-phenylurea methobromide

A mixture of 140 parts of the 1-(β-diethylaminoethyl)-1-cyclohexyl-3-benzyl-3-phenylurea and 173 parts of methyl bromide in 400 parts of butanone is maintained in a shielded pressure reactor at room temperature for an hour and the precipitate is collected on a filter, dissolved in isopropanol, treated with ether and maintained at 0° C. to cause precipitation of the 1-(β-diethylaminoethyl)-1-cyclohexyl-3-benzyl-3-phenylurea methobromide which melts at about 186–187° C. It has the structural formula

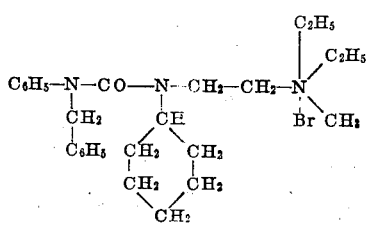

EXAMPLE 20

1-(δ-dimethylaminobutyl)-1-cyclopentyl-3-(o-tolyl)-3-(β-phenethyl)urea

A solution of 168 parts of cyclopentanone in 200 parts of ethanol is treated with 232 parts of N,N-dimethylputrescine and 75 parts of Raney nickel and the mixture is hydrogenated in a Parr medium pressure bomb for 5 hours at 100–110° C. and 600–650 pounds pressure. After cooling the contents of the bomb are filtered and the filtrate is evaporated. The residue is distilled at about 101–109° C. and 7 mm. pressure.

A mixture of 184 parts of N-(δ-dimethylaminobutyl)-cyclopentylamine and 273 parts of N-(β-phenethyl)-o-methylcarbanilyl chloride in 1800 parts of butanone is heated at reflux temperature for 10 hours, cooled and extracted with dilute hydrochloric acid. The extract is washed with ether, rendered alkaline by addition of sodium hydroxide and extracted with ether. This ether extract is dried over anhydrous potassium carbonate, filtered and evaporated to yield the 1-(δ-dimethylaminobutyl)-1-cyclopentyl-3-(o-tolyl)-3-(β-phenethyl)urea as an oil which is distilled at about 210–215° C. and 1–1.2 mm. pressure. It has the structural formula

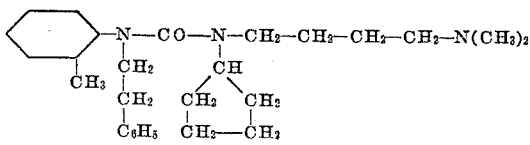

I claim:

1. A compound of the structural formula

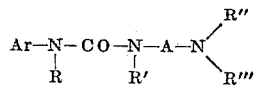

wherein A is a lower alkylene radical separating the two nitrogen atoms attached thereto by at least two carbon atoms; Ar is a member of the class consisting of aryl hydrocarbon radicals and halogenated aryl hydrocarbon radicals containing six to ten carbon atoms; R is a member of the class consisting of hydrogen, lower alkyl radicals, and aromatic hydrocarbon radicals containing six to ten carbon atoms; R′ is a member of the class consisting of aromatic hydrocarbon radicals containing six to ten carbon atoms and lower cycloalkyl radicals; NR″R‴ is a member of the class consisting of lower dialkylamino radicals, morpholino radicals and piperidino radicals.

2. A compound of the structural formula

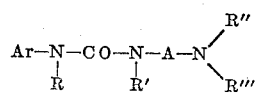

wherein A is a lower alkylene radical separating the two nitrogen atoms attached thereto by at least two carbon atoms; Ar is an aryl hydrocarbon radical containing six to ten carbon atoms, R, R″ and R‴ are lower alkyl radicals, and R′ is an aromatic hydrocarbon radical containing six to ten carbon atoms.

3. A compound of the structural formula

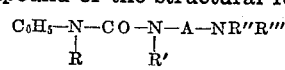

wherein A is a lower alkylene radical separating the two nitrogen atoms attached thereto by at least two carbon atoms; R, R″ and R‴ are lower alkyl radicals and R′ is an aryl hydrocarbon radical containing six to ten carbon atoms.

4. A compound of the structural formula

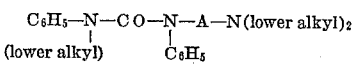

wherein A is a lower alkylene radical separating the two nitrogen atoms attached thereto by at least two carbon atoms.

5. N-(β-diethylaminoethyl)-N′-ethylcarbanilide.

6. A compound of the structural formula

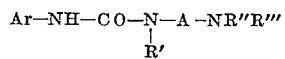

wherein A is a lower alkylene radical separating the two nitrogen atoms attached thereto by at least two carbon atoms, Ar is an aryl hydrocarbon radical containing six to ten carbon atoms, R′ is an aromatic hydrocarbon radical containing six to ten carbon atoms, and R″ and R‴ are lower alkyl radicals.

7. A compound of the structural formula

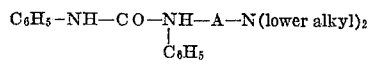

wherein A is a lower alkylene radical separating the two nitrogen atoms attached thereto by at least two carbon atoms.

8. A compound of the structural formula

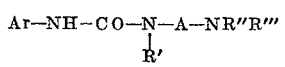

wherein A is a lower alkylene radical separating the two nitrogen atoms attached thereto by at least two carbon atoms, Ar is a halogenated phenyl radical, R′ is an aromatic hydrocarbon radical containing six to ten carbon atoms, and R″ and R‴ are lower alkyl radicals.

9. A compound of the structural formula

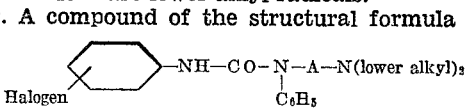

wherein A is a lower alkylene radical separating the two nitrogen atoms attached thereto by at least two carbon atoms.

10. 1-(β-diethylaminoethyl)-1-phenyl-3-(o-chlorophenyl)urea.

11. A compound of the structural formula

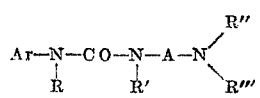

wherein A is a lower alkylene radical separating the two nitrogen atoms attached thereto by at least two carbon atoms; Ar is an aryl hydrocarbon radical containing six to ten carbon atoms, R and R' are aromatic hydrocarbon radicals containing six to ten carbon atoms, and R" and R''' are lower alkyl radicals.

12. A compound of the structural formula

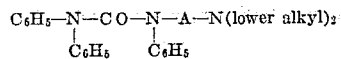

wherein A is a lower alkylene radical separating the two nitrogen atoms attached thereto by at least two carbon atoms.

13. 1 - ($\beta$ - diethylaminoethyl) - 1,3,3, - triphenylurea.

14. A compound of the structural formula

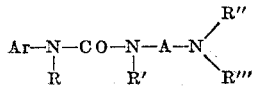

wherein A is a lower alkylene radical separating the two nitrogen atoms attached thereto by at least two carbon atoms; Ar is an aryl hydrocarbon radical containing six to ten carbon atoms, R is an aromatic hydrocarbon radical containing six to ten carbon atoms, R' is a lower cycloalkyl radical, and R" and R''' are lower alkyl radicals.

15. A compound of the structural formula

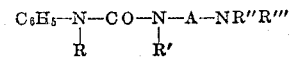

wherein A is a lower alkylene radical separating the two nitrogen atoms attached thereto by at least two carbon atoms; R is a lower phenylalkyl radical, R' is a lower cycloalkyl radical, and R" and R''' are lower alkyl radicals.

16. A compound of the structural formula

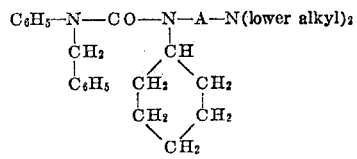

wherein A is a lower alkylene radical separating the two nitrogen atoms attached thereto by at least two carbon atoms.

JOHN W. CUSIC.

References Cited in the file of this patent
UNITED STATES PATENTS

| Number | Name | Date |
|---|---|---|
| 2,253,773 | Engel | Aug. 26, 1941 |

OTHER REFERENCES

Wenker: "J. Am. Chem. Soc.," vol. 60 (1938), pp. 158–159.